(12) United States Patent
Sheridan

(10) Patent No.: US 11,286,885 B2
(45) Date of Patent: Mar. 29, 2022

(54) EXTERNAL CORE GAS TURBINE ENGINE ASSEMBLY

(71) Applicant: United Technologies Corporation, Hartford, CT (US)

(72) Inventor: William G. Sheridan, Southington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 2332 days.

(21) Appl. No.: 14/458,421

(22) Filed: Aug. 13, 2014

(65) Prior Publication Data
US 2015/0247455 A1 Sep. 3, 2015

Related U.S. Application Data

(60) Provisional application No. 61/866,060, filed on Aug. 15, 2013.

(51) Int. Cl.
| | |
|---|---|
| F02K 3/12 | (2006.01) |
| F02C 6/02 | (2006.01) |
| B64D 27/12 | (2006.01) |
| F02K 3/077 | (2006.01) |
| F02C 7/32 | (2006.01) |
| F02K 3/06 | (2006.01) |
| F02C 3/10 | (2006.01) |

(52) U.S. Cl.
CPC .............. *F02K 3/12* (2013.01); *B64D 27/12* (2013.01); *F02C 3/10* (2013.01); *F02C 6/02* (2013.01); *F02C 7/32* (2013.01); *F02K 3/06* (2013.01); *F02K 3/077* (2013.01)

(58) Field of Classification Search
CPC ... F02K 3/12; F02K 3/06; F02K 3/077; F02K 3/04; F02C 6/02; F02C 3/10; F02C 7/32; F02C 7/36; B64D 27/12
See application file for complete search history.

(56) References Cited

U.S. PATENT DOCUMENTS

| | | | | |
|---|---|---|---|---|
| 2,501,078 A | * | 3/1950 | Newcomb | F02K 3/12 244/15 |
| 2,586,054 A | * | 2/1952 | Jonas | B64C 11/48 244/60 |
| 2,973,165 A | * | 2/1961 | MacAulay | B64C 23/005 244/123.8 |
| 3,054,577 A | * | 9/1962 | Wolf | B64D 27/12 244/11 OB |
| 3,368,352 A | * | 2/1968 | Hewson | F02K 3/025 60/224 |
| 3,442,082 A | * | 5/1969 | Peterson | F02K 3/12 60/224 |
| 3,517,509 A | * | 6/1970 | Bayati | F02K 3/077 60/226.1 |

(Continued)

FOREIGN PATENT DOCUMENTS

GB 629143 A * 9/1949 ............ B64D 27/12

*Primary Examiner* — Alain Chau
(74) *Attorney, Agent, or Firm* — Carlson, Gaskey & Olds, P.C.

(57) ABSTRACT

A gas turbine engine utilizes one or more gas generators having a core inlet flowpath and an exhaust outlet. Adjacently offset from the core gas generator, is a propulsor assembly. An exhaust outlet of the core gas generator is fluidly connected to the propulsor assembly and exhaust from the gas generator drives a fan drive turbine.

18 Claims, 4 Drawing Sheets

(56) References Cited

U.S. PATENT DOCUMENTS

| | | | | |
|---|---|---|---|---|
| 3,659,422 | A | * | 5/1972 | Hope .................... F02K 1/1207 60/224 |
| 3,739,580 | A | * | 6/1973 | Bland ........................ F02K 5/02 244/12.3 |
| 3,792,586 | A | * | 2/1974 | Kasmarik ............. F01D 25/162 384/141 |
| 4,193,262 | A | * | 3/1980 | Snell ......................... F02C 7/32 60/262 |
| 5,246,188 | A | * | 9/1993 | Koutsoupidis .......... B64C 27/26 244/12.3 |
| 6,092,361 | A | | 7/2000 | Romani |
| 6,688,552 | B2 | * | 2/2004 | Franchet ................... F02K 3/04 244/12.3 |
| 6,792,746 | B2 | * | 9/2004 | Saito ......................... F02C 1/02 60/224 |
| 6,834,495 | B2 | * | 12/2004 | Saito ......................... F02C 3/10 60/224 |
| 6,845,606 | B2 | * | 1/2005 | Franchet ................. F02K 3/025 60/225 |
| 7,055,330 | B2 | * | 6/2006 | Miller ....................... F02C 7/32 60/792 |
| 7,062,900 | B1 | | 6/2006 | Brun |
| 7,134,269 | B2 | | 11/2006 | Walsh et al. |
| 7,309,210 | B2 | | 12/2007 | Suciu et al. |
| 7,383,684 | B2 | | 6/2008 | Vuk |
| 8,015,796 | B2 | * | 9/2011 | Babu ..................... F01D 13/003 60/226.1 |
| 8,176,725 | B2 | | 5/2012 | Norris et al. |
| 8,261,527 | B1 | * | 9/2012 | Stearns .................... F02C 7/06 60/39.08 |
| 8,336,289 | B2 | | 12/2012 | Roberge |
| 8,402,740 | B2 | * | 3/2013 | Guemmer ............... F02K 3/077 60/226.1 |
| 8,726,633 | B2 | * | 5/2014 | Roberge .................... F02C 9/00 60/226.1 |
| 2002/0190158 | A1 | * | 12/2002 | Franchet ................... F02C 7/36 244/55 |
| 2006/0054739 | A1 | * | 3/2006 | Perez ..................... B64D 27/02 244/55 |
| 2007/0245710 | A1 | | 10/2007 | Schumacher et al. |
| 2009/0302152 | A1 | * | 12/2009 | Knight ................... B64D 41/00 244/58 |
| 2012/0272656 | A1 | | 11/2012 | Norris |
| 2017/0057649 | A1 | * | 3/2017 | Rice ....................... B64C 27/20 |

* cited by examiner

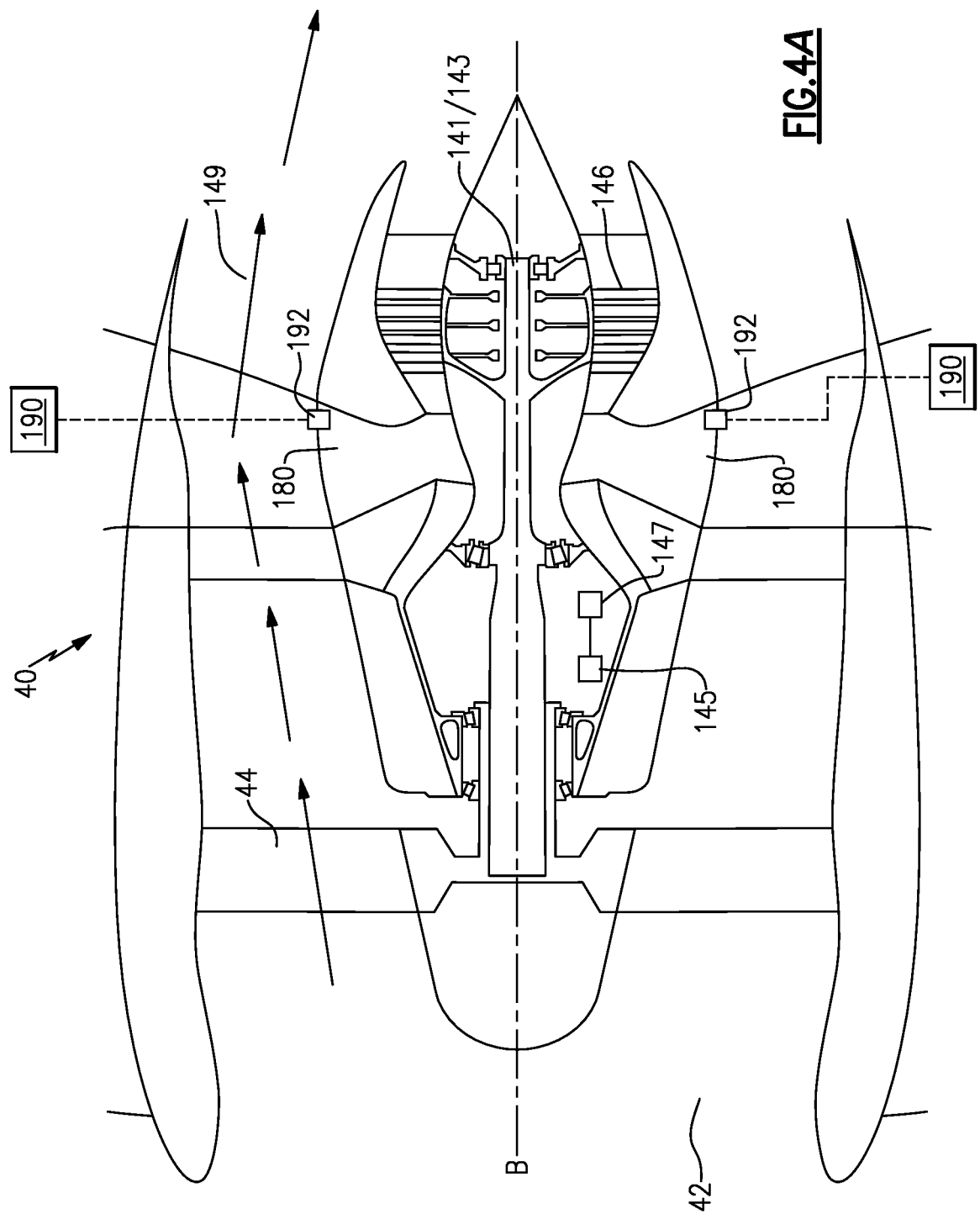

EXTERNAL CORE GAS TURBINE ENGINE ASSEMBLY

TECHNICAL FIELD

The present disclosure relates generally to gas turbine engines, and more specifically to an external core gas turbine engine assembly.

BACKGROUND OF THE INVENTION

Commercial aircraft, such as passenger or freight aircraft, often include multiple gas turbine engines mounted below the wing structure of the aircraft. The gas turbine engines each include a compressor, combustor and turbine that cooperate to generate rotational energy. The rotational energy is then used to drive a fan. The fan draws air into a bypass flowpath and generates propulsion that drives the aircraft forward. The compressor, combustor and turbine portions are collectively referred to as an "engine core" or a "core gas generator".

In known gas turbine engine constructions, one or more engine cores are included within the turbine engine and share an axis with the fan. The rotation generated via the turbine section is imparted to a shaft that is connected to the fan either directly or through a geared architecture. As a result of the mechanical connection between the shafts, the rotation of the turbine mechanically drives the fan section.

With the introduction of the geared architecture, engine cores are driven to a smaller size, while simultaneously being able to support a significantly larger fan size. The combination of the large fan size and the smaller engine core size can lead to ground clearance issues when the gas turbine engine is mounted below the wing, as in the typical construction.

SUMMARY OF THE INVENTION

A gas turbine engine according to an exemplary embodiment of this disclosure, among other possible things includes a gas generator having a core inlet flowpath for receiving ambient air, and an exhaust outlet for directing therefrom combusted fuel, a propulsor assembly including a fan, a fan drive turbine, and a propulsor inlet flowpath for receiving ambient air, the core inlet flowpath is adjacently offset from the propulsor inlet flowpath, and the exhaust outlet is fluidly connected to the fan drive turbine and drives the fan drive turbine.

In a further embodiment of the foregoing gas turbine engine, the fan drive turbine includes a turbine shaft, and the turbine shaft is connected to the main shaft via a gear system.

In a further embodiment of the foregoing gas turbine engine, the fan drive turbine is disposed about, and connected to, the main shaft.

In a further embodiment of the foregoing gas turbine engine, the exhaust outlet is fluidly connected to the propulsor assembly via a duct connected to the exhaust outlet and to a fluid inlet in the propulsor assembly.

In a further embodiment of the foregoing gas turbine engine, the duct is a structural support for at least one of the gas generator and the propulsor assembly.

In a further embodiment of the foregoing gas turbine engine, the fluid inlet in the propulsor assembly is downstream of the fan.

In a further embodiment of the foregoing gas turbine engine, each of the gas generators is a multiple spool gas generator having a high pressure compressor and a low pressure compressor within a core compressor section, and a high pressure turbine and a low pressure turbine within a core turbine section.

In a further embodiment of the foregoing gas turbine engine, each of the gas generators is a self-contained gas generator.

In a further embodiment of the foregoing gas turbine engine, the fan mechanically drives a lubricant pump and wherein the lubricant pump provides lubrication to a plurality of systems within the propulsor assembly.

In a further embodiment of the foregoing gas turbine engine, the at least one gas generator is out of line with a bypass flowpath of the propulsor assembly.

In a further embodiment of the foregoing gas turbine engine, the fan drive turbine is fluidly driven by an exhaust from the gas generator.

A aircraft according to an exemplary embodiment of this disclosure, among other possible things includes at least a first and second wing, each of the first and second wing include an external core gas turbine engine having, a gas generator including a core inlet flowpath for receiving ambient air, and an exhaust outlet for directing therefrom combusted fuel, a propulsor assembly including a fan, a fan drive turbine, and a propulsor inlet flowpath, the core inlet flowpath is adjacently offset from the propulsor inlet flowpath, the exhaust outlet is fluidly connected to the propulsor assembly, and at least one of the at least one gas generator and the propulsor assembly is embedded in the corresponding wing.

In a further embodiment of the foregoing aircraft, each of the gas generators and the propulsor assembly are embedded in the corresponding wing.

In a further embodiment of the foregoing aircraft, the exhaust outlet is fluidly connected to the propulsor assembly via a duct connected to the exhaust outlet and to a fluid inlet in the propulsor assembly.

In a further embodiment of the foregoing aircraft, the duct is a structural support for at least one of the core gas generator and the fan propulsor assembly.

In a further embodiment of the foregoing aircraft, the fluid inlet in the propulsor assembly is downstream of the fan.

In a further embodiment of the foregoing aircraft, a propulsor assembly turbine section is driven by an exhaust from the at least one gas generator.

A method of generating propulsion according to an exemplary embodiment of this disclosure, among other possible things includes operating at least one gas generator out of line with a bypass flowpath of a propulsor assembly, directing exhaust gasses from the at least one gas generator to the propulsor assembly, and fluidly driving a propulsor turbine assembly using the exhaust gasses.

These and other features of the present invention can be best understood from the following specification and drawings, the following of which is a brief description.

BRIEF DESCRIPTION OF THE DRAWINGS

FIG. 4A schematically illustrates an alternate example propulsor assembly for the external core gas turbine engine structure of FIG. 2.

DETAILED DESCRIPTION OF AN EMBODIMENT

Figure 1:
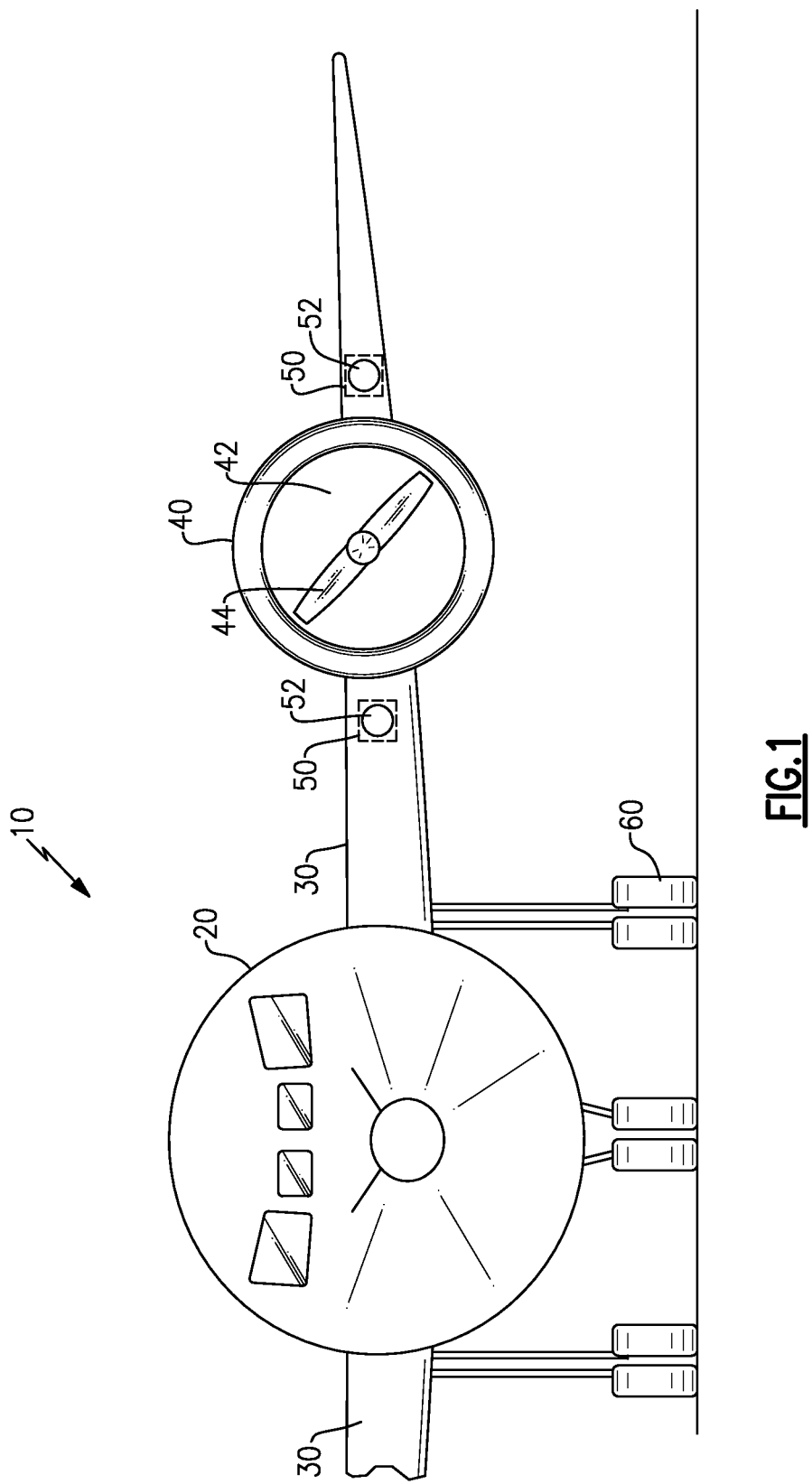
FIG. 1 schematically illustrates a front facing partial view of a commercial aircraft.

FIG. 1 schematically illustrates a front facing partial view of an aircraft 10. The aircraft 10 includes a fuselage 20 and multiple wings 30. Each of the wings 30 includes a propulsor assembly 40 and two core gas generators 50 embedded within the wing 30. In alternate examples a single core gas generator 50, or more than two core gas generators 50, can be utilized. In another alternate example aircraft 10, one or more of the core gas generators 50 and the propulsor assembly 40 can be mounted below the wing 30 instead of embedded within the wing 30. The aircraft 10 is supported via a landing gear 60 while on the ground.

Each of the core gas generators 50 includes a gas inlet 52 that admits air into the core gas generator 50. The air admitted into the core gas generators 50 travels through the core gas generator 50 along a core inlet flowpath. In the illustrated example, the core gas generators 50 each utilize an independent inlet 52. Similarly, the propulsor assembly 40 includes an air inlet 42 to allow air to enter the propulsor assembly 40 along a bypass flowpath. The bypass flowpath of the propulsor assembly 40 is alternately referred to as a propulsor inlet flowpath. Located within the inlet 42 is a fan 44 that rotates and drives the air through the bypass flowpath of the propulsor assembly 40 thereby generating propulsion The core gas generators 50 and the propulsor assembly 40 combined are referred to as an external core gas turbine engine because the core gas generator 50 are located external to the propulsor assembly 40.

Exhaust outlets of the core gas generators 50 are connected to exhaust inlets in the propulsor assembly 40, thereby allowing the core gas generators 50 to fluidly drive the propulsor assembly 40.

As each of the core gas generators 50 is external to the propulsor assembly 40, each of the core gas generators 50 is also out of line with a bypass flowpath of the propulsor assembly 40.

Figure 2:
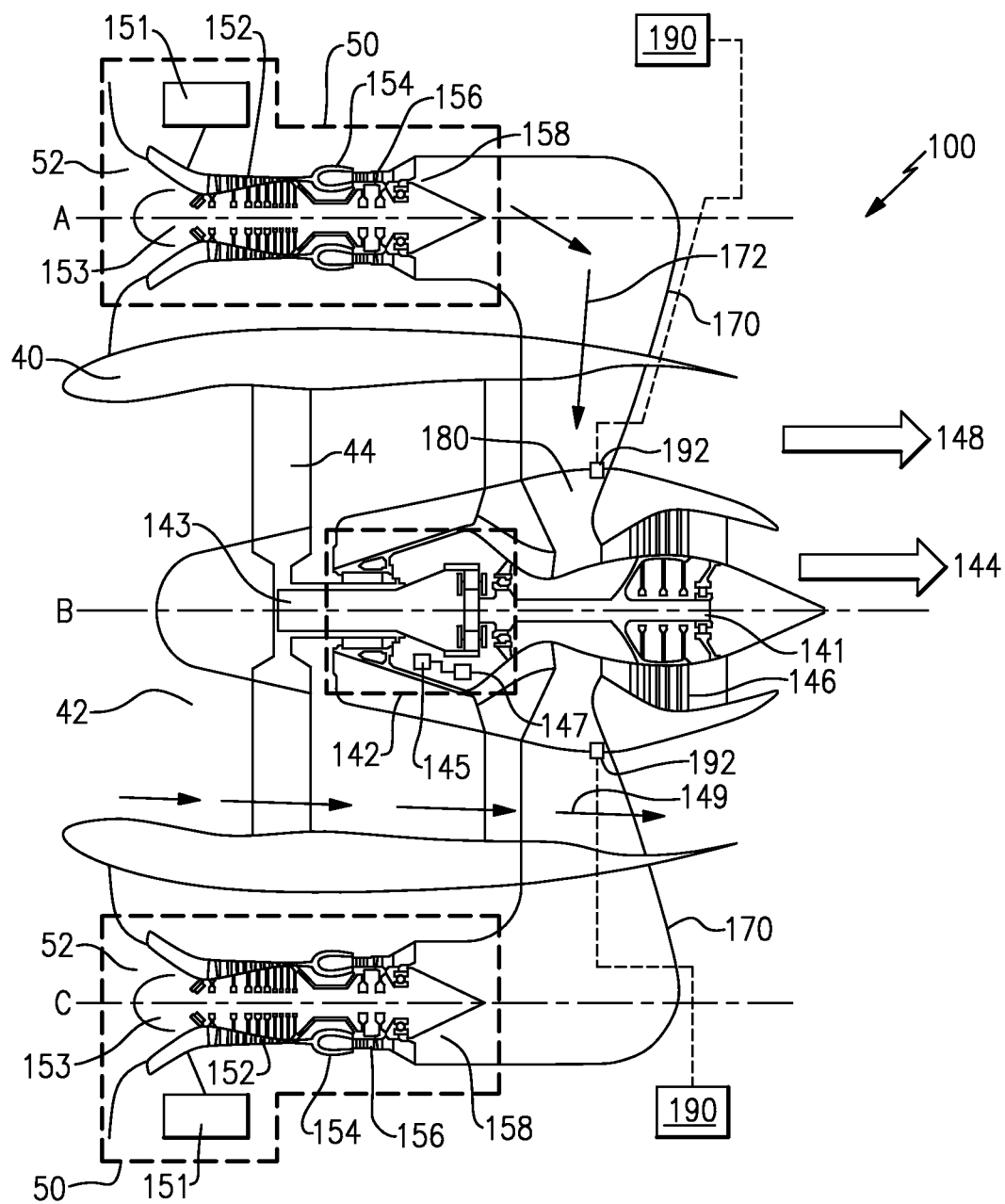
FIG. 2 schematically illustrates a top cross sectional partial view of an external core gas turbine engine structure.

FIG. 2 schematically illustrates a top cross sectional partial view of the structure of an external core gas turbine engine 100. The illustrated external core gas turbine engine 100 structure includes two core gas generators 50 each having an inlet 52 and defining an axis A, C. Each core gas generator 50 further includes a compressor section 152, a combustor 154, a turbine section 156, and an exhaust outlet 158. The inlet 52, compressor section 152, combustor 154, turbine section 156, and exhaust outlet 158 define a fluid flowpath originating at the inlet 52 and terminating at the exhaust outlet 158.

The compressor section 152 rotates and compresses the gas (air) as it enters the core gas generator 50 flowpath via the inlet 52. The compressed gas is provided to the combustor 154. In the combustor 154, fuel is ignited causing combustion. The combustion combined with the pressurized gas from the compressor section 152 expels the gas into the turbine section 156 driving the turbine section 156 to spin. As the core gas generator 50 utilizes a single shaft 153 (alternately referred to as a spool), the spinning of the turbine section 156 directly drives the compressor section 152.

As a result of this process, high pressure exhaust gasses are expelled out the exhaust outlet 158 of the core gas generator 50. Rather than exhausting these gasses behind the wing of the aircraft 10, the high pressure gasses are exhausted to a duct 170 that connects the exhaust outlet 158 to an exhaust inlet 180 in the propulsor assembly 40. The high pressure exhaust gasses travel along an exhaust flowpath 172, and are provided to the fan drive turbine 146 of the propulsor assembly 40 via the exhaust inlet 180. The pressurized exhaust gasses drive the fan drive turbine 146 of the propulsor assembly 40 as described below. This flowpath causes the core gas generators 50 to fluidly drive the fan drive turbine 146 of the propulsor assembly 40.

Each of the core gas generators 50 also includes an accessory gearbox 151 that functions as an independent starter for the core gas generator 50. The accessory gearbox 151 includes an oil pump, fuel pump and an engine electric generator. In alternate examples the accessory gearbox 151 can also include any additional necessary elements in order to allow the core gas generator 50 to operate independently of the other core gas generators 50 and the propulsor assembly 40.

Also included in the external core gas turbine engine 100 is the propulsor assembly 40. The propulsor assembly 40 includes an inlet 42 (alternately referred to as the propulsor inlet) and a fan 44 disposed within the inlet 42. The fan 44 is mechanically connected to a fan shaft 143. The fan shaft 143 is, in turn, mechanically connected to a propulsor turbine shaft 141 to which a fan drive turbine 146 is mounted. In the illustrated example of FIG. 2, the fan shaft 143 is indirectly connected to the propulsor turbine shaft 141 via a gearing system 142, though a direct connection is within the scope of the disclosure. Also connected to the gearing system 142 is a mechanically driven oil pump 145 The mechanically driven oil pump 145 provides "lubricating oil" to the various propulsor assembly systems such as a cooling system 147 (illustrated schematically), and is driven by the rotation in the gearing system 142. The oil cooling circuit and thermal management system are not shown in the figure and can be mounted in the propulsor assembly 40 or on the external core 100 using conventional methods familiar to one skilled in the art.

The exhaust gas inlet is located downstream of the propulsor fan 44 and upstream of the fan drive turbine 146 relative to a propulsor assembly bypass flowpath 149. The exhaust inlets 180 accept the pressurized exhaust gasses from the core gas generators 50, and direct the exhaust gasses through the fan drive turbine 146, thereby driving the fan drive turbine, the turbine shaft 141 and the fan 44. The exhaust gasses are then expelled behind the fan drive turbine 146 in an exhaust stream 144. Ambient air drawn into the propulsor assembly 40 via the fan 44 passes through the bypass flowpath 149 and is expelled behind the propulsor assembly 40 in a bypass exhaust stream 148.

In some examples, external core gas turbine engines 10, the duct 170 connecting the exhaust outlet 158 to the exhaust inlet 180 can be used to physically support either the core gas generator 50 or the propulsor assembly 40 in addition to directing the exhaust gasses.

When the external core gas turbine engine 100 includes multiple core gas generators 50, the core gas generators 50 are balanced so that they provide approximately equal exhaust gas pressures at the propulsor assembly 40 exhaust inlets 180. If the exhaust gasses entering the propulsor assembly 40 at the inlets 180 are extensively differing in pressure, the higher pressure exhaust gasses run the risk of backflowing into the core gas generators 50 providing the lower pressure exhaust gasses. The exhaust pressure balancing can be performed using an encoded aircraft controller 190, and a sensor located at each of the exhaust inlets 180.

Figure 3:
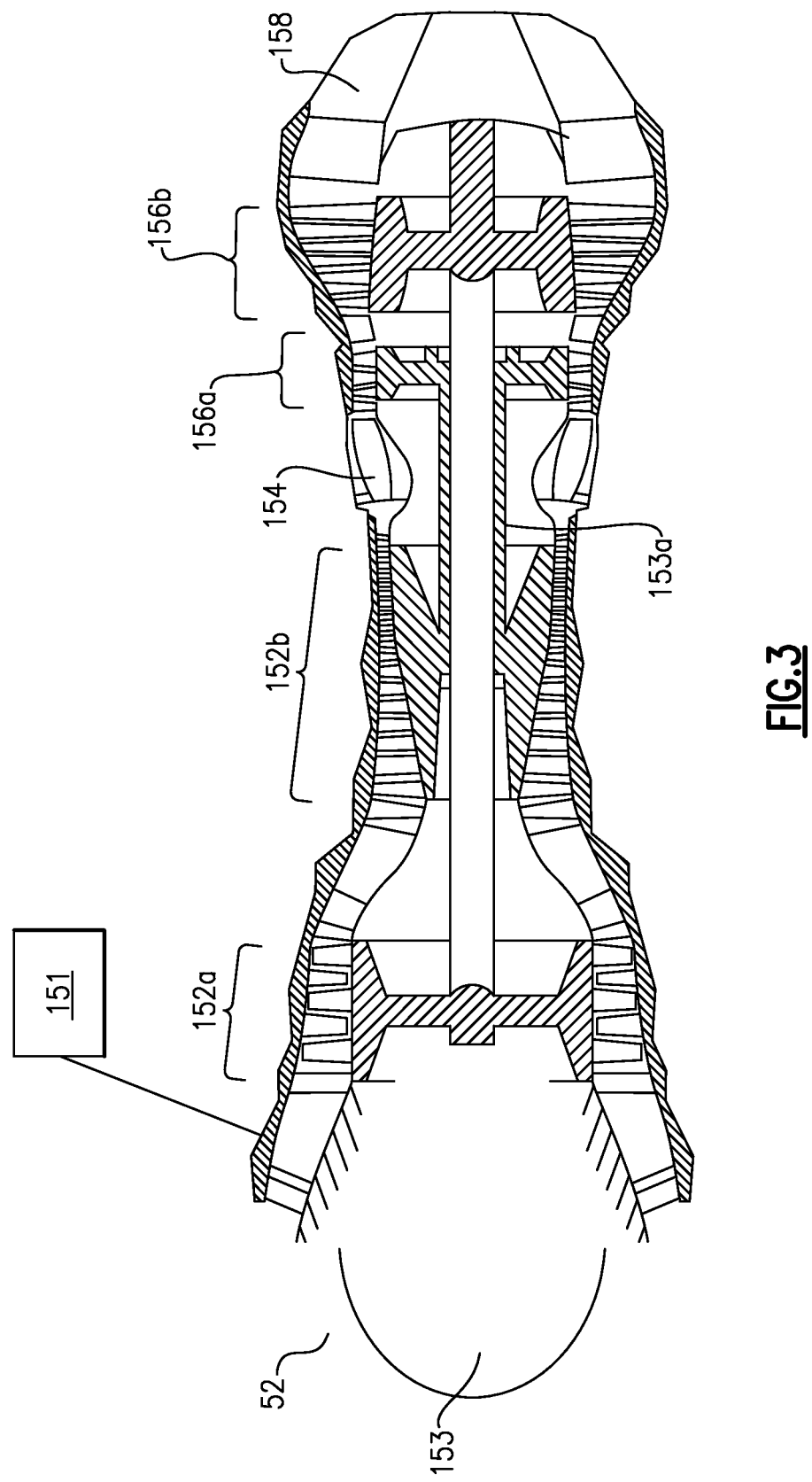
FIG. 3 schematically illustrates an alternate example gas generator core for the external core gas turbine engine structure of FIG. 2.

With continued reference to FIGS. 1 and 2, and with like numerals indicating like elements, FIG. 3 illustrates an alternate example core gas generator 50. The alternate example core gas generator 50 illustrated in FIG. 3 differs from the example of FIG. 2 in that the example of FIG. 3 separates the compressor section 152 into a low pressure compressor 152a and a high pressure compressor 152b, and separates the turbine section 156 into a high pressure turbine 156a and a low pressure turbine 156b. The high pressure compressor section 152b and the high pressure turbine 156a are fixed to a second, high pressure, shaft 153a. The high pressure shaft 153a is connected to the core shaft 153 via a gearing system in a known configuration. It is further possible to utilize multiple different architectures of core gas generators 50 in a single external core gas turbine engine 100, provided the exhaust pressure is properly balanced.

Moreover, in a direct drive configuration, illustrated in FIG. 4A, due to the lack of a gearing section 142, the mechanically driven oil pump 145 receives pumping force from another suitable system such as the turbines and not the propulsor assembly. In a further alternate example, the mechanically driven oil pump 145 is replaced by an electrically driven oil pump. The mechanically driven oil pump assembly 145 provides cooling and lubricating fluids to the rotating components of the propulsor assembly 40. The mechanically driven oil pump assembly is also connected to, and driven by, the rotation of the shaft 143.

This above described external core gas turbine engine 10 allows multiple core gas generators to be embedded in the wing 30 of the aircraft. The core gas generators are used to fluidly drive a single fan propulsor with traditional forward flow. Since the core gas generators 50 are fluidly connected to the propulsor assembly 40, one unit can fail without losing drive to the propulsor assembly 40. Since the core gas generators 50 are independent, each can drive an airframe electric generator or hydraulic pump and offer fail safe redundancy using smaller accessory components.

By being embedded in the wing, a very large fan can be used without requiring unusually tall landing gear or violating engine ground clearance safety requirements. The removal of the core gas generator components from the propulsor assembly 40 allows the axial length of the propulsor assembly to be greatly reduced. The extremely short propulsor assembly 40 mitigates critical speed issues with some single core engines that require long high speed shafting to be fitted beneath the core gas generator.

Maintenance efforts are also improved because the propulsor assembly 40 can remain on wing for long periods of time, while the smaller core gas generators 50 can be easily removed for turbine and combustor repairs at shorter intervals.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a first gas generator including a first core inlet for receiving ambient air, and an-a first exhaust outlet for directing therefrom combusted fuel, the first core inlet defining a first core inlet flowpath, and a second gas generator including a second core inlet for receiving ambient air, and a second exhaust outlet for directing therefrom combusted fuel, the second core inlet defining a second core inlet flowpath;
a propulsor assembly including a fan driven by a main shaft, a fan drive turbine, and a propulsor inlet for receiving ambient air, the propulsor assembly being out of line with the first gas generator and the second gas generator, and the propulsor inlet defining a propulsor inlet flowpath;
wherein the first core inlet flowpath and the second core inlet flowpath are adjacently offset from the propulsor inlet flowpath, and the first core inlet defines a first axis parallel with a second axis defined by the propulsor inlet and the second core inlet defines a third axis;
wherein said first exhaust outlet and said second exhaust outlet are fluidly connected to said fan drive turbine and drive said fan drive turbine;
wherein said first exhaust outlet is fluidly connected to said propulsor assembly via a first duct connecting said first exhaust outlet to a first fluid inlet of said propulsor assembly, the first duct providing structural support for at least one of the propulsor assembly and the first gas generator;
wherein said second exhaust outlet is fluidly connected to said propulsor assembly via a second duct connecting said second exhaust outlet to a second fluid inlet of said propulsor assembly, the second duct providing structural support for at least one of the propulsor assembly and the second gas generator and
wherein at least one of the propulsor assembly, the first gas generator and the second gas generator is configured to be embedded in a wing of an aircraft.

2. The gas turbine engine of claim 1, wherein the fan drive turbine includes a turbine shaft, and wherein the turbine shaft is connected to the main shaft via a gear system.

3. The gas turbine engine of claim 1, wherein the fan drive turbine is disposed about, and connected to, the main shaft.

4. The gas turbine engine of claim 1, wherein each of said first and second gas generators are a multiple spool gas generator having a high pressure compressor and a low pressure compressor within a core compressor section, and a high pressure turbine and a low pressure turbine within a core turbine section.

5. The gas turbine engine of claim 1, wherein said first and second gas generators are self-contained gas generators.

6. The gas turbine engine of claim 1, wherein the fan is connected to a fan drive turbine shaft via a gear system, wherein the gear system mechanically drives a lubricant pump and wherein the lubricant pump provides lubrication to a plurality of systems within said propulsor assembly.

7. The gas turbine engine of claim 1, wherein said first and second gas generators are out of line with a bypass flowpath of said propulsor assembly.

8. The gas turbine engine of claim 1, wherein said fan drive turbine is fluidly driven by an exhaust from said first and second gas generators.

9. The gas turbine engine of claim 1, wherein both the propulsor assembly and the first and second gas generators are configured to be embedded in the wing of the aircraft.

10. The gas turbine engine of claim 1, wherein the fan drive turbine is configured to drive the main shaft.

11. The gas turbine engine of claim 1, wherein the propulsor assembly includes an ambient air inlet and an exhaust to ambient air and wherein the ambient air inlet and the exhaust to ambient air are in line with each other.

12. An aircraft comprising:
at least a first and second wing, wherein each of said first and second wing include an external core gas turbine engine with each external core gas turbine engine having:
a first gas generator including a core inlet defining a first core inlet flowpath for receiving ambient air, and an exhaust outlet for directing therefrom combusted fuel, a propulsor assembly including a fan, a fan drive turbine configured to mechanically drive rotation of the fan via a main shaft, and a propulsor inlet defining a propulsor inlet flowpath wherein the first core inlet flowpath is adjacently offset
from the propulsor inlet flowpath, and the propulsor core inlet flowpath defines a first axis parallel to and a second axis defined by the propulsor inlet;
a second gas generator identical to the first gas generator, and defining a second core inlet flowpath parallel to, and adjacently offset from, the first core inlet flowpath;
wherein each of said exhaust outlet of the first and second gas generators are fluidly connected to said propulsor assembly;
wherein at least one of the first and second gas generators of said first wing and the propulsor assembly of the first wing are embedded in the first wing; and
wherein said first and second gas generators are out of line with said propulsor assembly.

13. The aircraft of claim 12, wherein at least one of said first and second gas generators of the second wing and said propulsor assembly of the second wing are both embedded in the second wing.

14. The aircraft of claim 12, wherein each exhaust outlet of the first and second gas generators are fluidly connected to said propulsor assembly via a respective duct connected to said exhaust outlet and to a respective fluid inlet in said propulsor assembly.

15. The aircraft of claim 14, wherein each of said respective duct is a structural support for at least one of said respective gas generator and said fan propulsor assembly.

16. The aircraft of claim 14, wherein said fluid inlet in said propulsor assembly is downstream of said fan.

17. The aircraft of claim 12, wherein a propulsor assembly turbine section is driven by an exhaust from said first and second gas generators.

18. A gas turbine engine comprising:
a first gas generator including a core inlet for receiving ambient air, the core inlet defining a core inlet flowpath, and an exhaust outlet for directing therefrom combusted fuel, and a second gas generator identical to the first gas generator;
a propulsor assembly including a fan driven by a main shaft, a fan drive turbine, and a propulsor inlet for receiving ambient air, the propulsor inlet defining a propulsor inlet flowpath;
wherein the core inlet flowpath is adjacently offset from the propulsor inlet flowpath, and wherein the propulsor inlet defines a first axis parallel to a second axis defined by the core inlet;
wherein said exhaust outlet is fluidly connected to said fan drive turbine and drives said fan drive turbine;
wherein said exhaust outlet is fluidly connected to said propulsor assembly via a duct connecting said exhaust outlet to a fluid inlet of said propulsor assembly, the duct providing structural support for at least one of the propulsor assembly and the first gas generator;
wherein at least one of the propulsor assembly and the first gas generator is configured to be embedded in a wing of an aircraft;
wherein said fluid inlet in said propulsor assembly is downstream of said fan; and
wherein said second gas generator is connected to the propulsor assembly in an identical configuration as the first gas generator.

* * * * *